US012559916B2

(12) United States Patent
Pahl et al.

(10) Patent No.: US 12,559,916 B2
(45) Date of Patent: Feb. 24, 2026

(54) WORK MACHINE CONTROL SYSTEM FOR INDICATING IMPLEMENT POSITION

(71) Applicant: Caterpillar Inc., Peoria, IL (US)

(72) Inventors: Justin Philip Pahl, Holly Springs, NC (US); Joshua David Callaway, Cary, NC (US)

(73) Assignee: Caterpillar Inc., Peoria, IL (US)

( * ) Notice: Subject to any disclaimer, the term of this patent is extended or adjusted under 35 U.S.C. 154(b) by 583 days.

(21) Appl. No.: 17/864,699

(22) Filed: Jul. 14, 2022

(65) Prior Publication Data

US 2024/0018751 A1 Jan. 18, 2024

(51) Int. Cl.
*E02F 9/26* (2006.01)
*E02F 3/32* (2006.01)
*G06T 3/60* (2024.01)
*G06T 11/00* (2006.01)

(52) U.S. Cl.
CPC ................ *E02F 9/264* (2013.01); *G06T 3/60* (2013.01); *G06T 11/00* (2013.01); *E02F 3/32* (2013.01)

(58) Field of Classification Search
CPC ... E02F 9/264; E02F 3/32; E02F 3/435; E02F 9/261; G06T 3/60; G06T 11/00
See application file for complete search history.

(56) References Cited

U.S. PATENT DOCUMENTS

| | | |
|---|---|---|
| 6,711,838 B2 | 3/2004 | Staub et al. |
| 7,079,931 B2 | 7/2006 | Sahm et al. |
| 9,624,648 B2 | 4/2017 | Arimatsu et al. |
| 11,834,813 B2 * | 12/2023 | Kalantar ................. E02F 9/265 |
| 2003/0115779 A1 | 6/2003 | Satzler et al. |
| 2014/0330508 A1 * | 11/2014 | Montgomery .......... G01S 17/06 |
| | | 701/408 |
| 2019/0024346 A1 * | 1/2019 | Nishi ........................ E02F 3/32 |
| 2020/0399862 A1 | 12/2020 | Okazaki |
| 2021/0087794 A1 | 3/2021 | Yamamoto |
| 2022/0170242 A1 | 6/2022 | Maley |
| 2023/0366174 A1 * | 11/2023 | Nishikawa .............. E02F 9/265 |
| 2023/0417025 A1 * | 12/2023 | Kean ....................... E02F 3/435 |

FOREIGN PATENT DOCUMENTS

| | | |
|---|---|---|
| JP | 2022060896 | 4/2022 |
| WO | 2021244774 | 12/2021 |

* cited by examiner

*Primary Examiner* — Abby J Flynn
*Assistant Examiner* — Paulo Roberto Gonzalez Leite

(57) ABSTRACT

A method for displaying a position of a boom-mounted implement relative to a swing indicator for an excavator having boom swing capabilities comprises displaying a propulsor icon of a set of propulsion units of the excavator on a display screen, displaying a housing icon of a housing of the excavator relative to the propulsor icon on the display screen, displaying a boom icon of the boom-mounted implement relative to the housing icon on the display screen, displaying the swing indicator relative to the propulsor icon on the display screen, updating a rotational position of the housing icon relative to the propulsor icon based on real-world movement of the housing relative to the set of propulsion units, and updating a location of the swing indicator relative to the propulsor icon based on real-world movement of the boom-mounted implement relative to the housing from the boom swing capabilities.

20 Claims, 9 Drawing Sheets

WORK MACHINE CONTROL SYSTEM FOR INDICATING IMPLEMENT POSITION

TECHNICAL FIELD

The present application relates generally, but not by way of limitation, to work machines used to perform various operations with a boom extending from a rotatable platform. More particularly, the present application relates to control systems for monitoring operations of an excavator.

BACKGROUND

Work machines are commonly used to move large amounts of earth or other material in an excavation or dredging operation. These work machines typically include a work implement that is designed to pick up a load of earth or other material from one location and drop off the load at a second location. For example, an excavator can include a work implement that has a ground engaging tool, such as a bucket or a clamshell. An operator can control the motion of the ground engaging tool to pick up a load of earth from an excavation site. The operator can then move the ground engaging tool to a dumping location, where the load of earth can be unloaded to a removal vehicle such as a haul truck.

These work machines are commonly powered by hydraulic systems, which can use pressurized fluid to both move the work implements and to move the machine. The hydraulic systems typically include a series of hydraulic actuators, such as hydraulic cylinders or fluid motors. The movement of these hydraulic actuators can be controlled by controlling the rate and direction of fluid flow into and out of each hydraulic actuator. Typically, a series of hydraulic actuators are distributed throughout the work machine to transmit the power required to move the work machine and the work implement. By controlling the rate and direction of fluid flow into the hydraulic actuators, the movement of the work machine and of the work implement can be controlled.

During an excavation or dredging type operation, an operator will often guide the work machine through a repetitive sequence of steps. For example, in an excavation operation, an operator of a work machine will move the ground engaging tool to a loading location where the ground engaging tool picks up a load of earth. The operator will then lift the ground engaging tool and move it to a dumping location where the load is unloaded to a removal vehicle. The operator will then return the ground engaging tool to the loading location to pick up a new load of earth. While working within this repetitive operation, or any other operation, it is desirable to prevent the work machine from coming into contact with objects not part of the operation, such as surrounding equipment, structures, trees and the like. For example, in a typical excavator, an operator housing can be rotated relative to ground-engaging prolusion units, and a front linkage from which the work implement is suspended can be rotated relative to the housing to position the work implement at the loading location and dumping location. It can, however, be difficult for the operator to maintain spatial awareness of all parts of the work machine due to, for example, the number of independently moveable parts.

U.S. Pat. No. 7,079,931 to Sahm et al. is titled "Positioning System for an Excavating Work Machine" and Publication No. US 2022/0170242 to Maley is titled "System and Method for Detecting Objects Within a Working Area."

SUMMARY OF THE INVENTION

A method for displaying a position of a boom-mounted implement relative to a swing indicator for an excavator having boom swing capabilities comprises displaying a propulsor icon of a set of propulsion units of the excavator on a display screen, displaying a housing icon of a housing of the excavator relative to the propulsor icon on the display screen, displaying a boom icon of the boom-mounted implement relative to the housing icon on the display screen, displaying the swing indicator relative to the propulsor icon on the display screen, updating a rotational position of the housing icon relative to the propulsor icon based on real-world movement of the housing relative to the set of propulsion units, and updating a location of the swing indicator relative to the propulsor icon based on real-world movement of the boom-mounted implement relative to the housing from the boom swing capabilities.

A control system for an excavator comprises a control configured to receive a plurality of inputs from a plurality of position sensors associated with a housing and a front linkage of the excavator, and an operator interface comprising a display screen configured to output a propulsor icon representing a set of propulsion units of the excavator, a housing icon representing the housing of the excavator, a boom icon representing the front linkage of excavator, and a swing indicator positioned relative to the propulsor icon, wherein the control is configured to update a rotational position of the housing icon relative to the propulsor icon based on real-world movement of the housing relative to the set of propulsion units and update a location of the swing indicator relative to the propulsor icon based on real-world movement of the front linkage relative to the housing.

DETAILED DESCRIPTION

Figure 1:
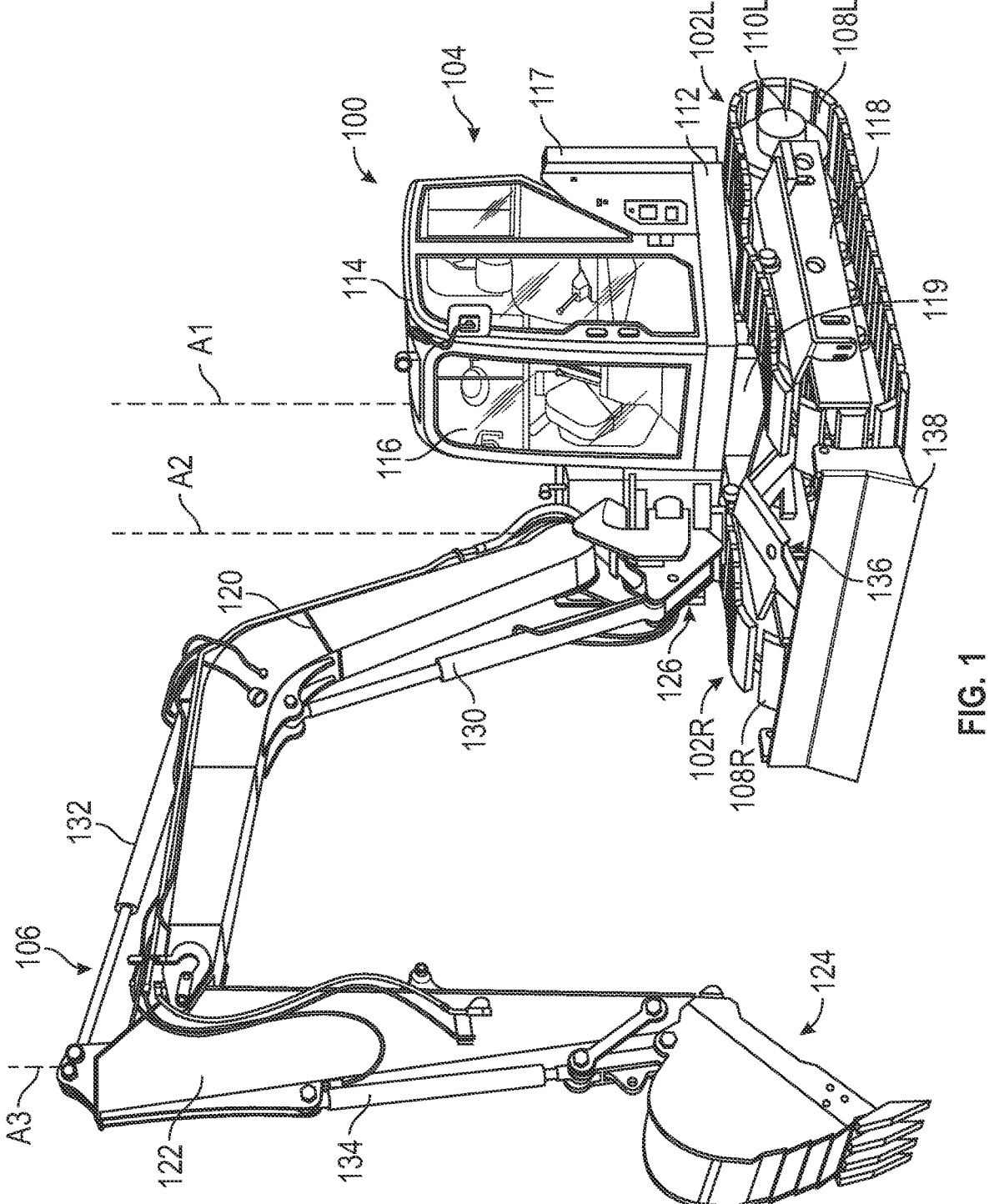
FIG. 1 is a perspective view of an excavator comprising a pair of propulsion units, a housing pivotably mounted on the pair of propulsion units and a front linkage extending from the housing via a swing coupler.
Figure 2:
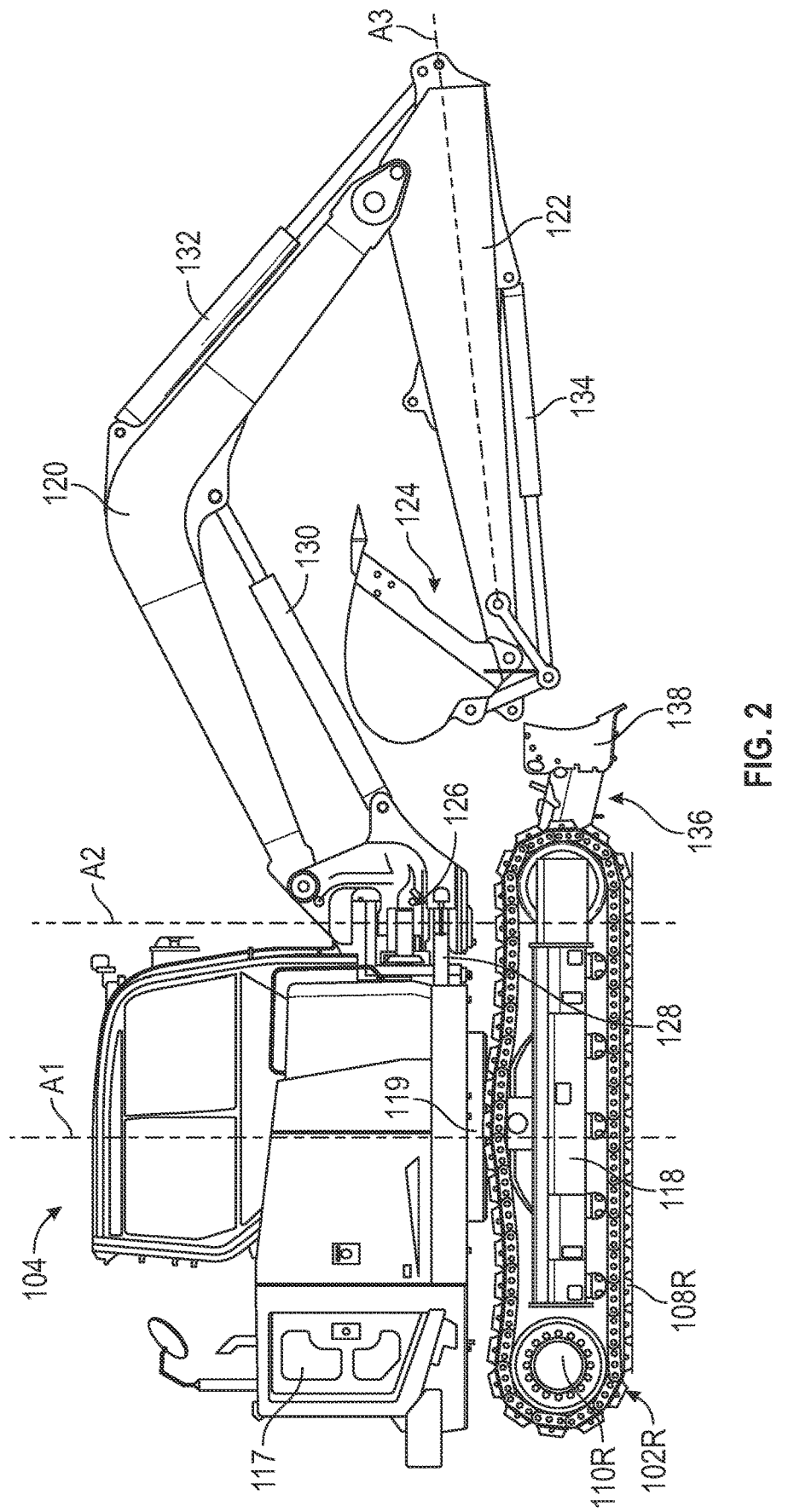
FIG. 2 is a side view of the excavator of FIG. 1 showing the front linkage comprising a boom, a stick and an implement.

FIG. 1 is a perspective view of excavator 100 comprising left propulsion unit 102L, right propulsion unit 102R, housing 104 pivotably mounted on the pair of propulsion units 102L and 102R and front linkage 106 extending from housing 104 via swing coupler 126. FIG. 2 is a side view of excavator 100 of FIG. 1. FIGS. 1 and 2 are discussed concurrently.

Propulsion units 102L and 102R can comprise devices for engaging the ground and driving excavator 100 in forward and backward directions. In the illustrated example, propulsion units 102L and 102R comprise endless tracks 108L and 108R configured to be driven by drive sprockets, such as drive sprocket 110L (FIG. 1) and drive sprocket 110R (FIG. 2). As is known in the art, one of endless tracks 108L and 108R can be rotated faster than the other to cause turning of excavator 100. In other examples, propulsion units 102L and 102R can comprise wheels.

Housing 104 can comprise platform 112, operator cab 114 having window 116, and power pack 117. Propulsion unit 102L and propulsion unit 102R can be connected together via undercarriage assembly 118. Undercarriage assembly 118 can be connected to platform 112 via swivel 119. Housing 104 can rotate relative to undercarriage assembly 118 about vertical axis A1 in a house swing operation. Excavator 100 can include an appropriate motor or actuator, e.g., actuator 140 (shown schematically in FIG. 3), to provide rotational output of housing 104.

Front linkage 106 can comprise boom 120, stick 122 and implement 124. Front linkage 106 can be connected to housing 104 by swing coupler 126, which can be mounted on platform 112. Front linkage 106 can rotate relative to platform 112 and housing 104 about vertical axis A2 via operation of swing coupler 126 in a boom swing operation. First actuator 128 can extend between platform 112 and swing coupler 126. Second actuator 130 can extend between swing coupler 126 and boom 120. Third actuator 132 can extend between boom 120 and stick 122. Fourth actuator 134 can extend between stick 122 and implement 124. Second actuator 130, third actuator 132 and fourth actuator 134 can be operated to move implement 124 in an up-and-down plane and in a front-and-back plane relative to the orientation of platform 112.

Power pack 117 can comprise an engine such as a diesel engine, a gasoline engine, a gaseous fuel-powered engine or any other type of combustion engine known in the art. In other examples, power pack 117 can comprise a non-combustion source of power such as a fuel cell, a power storage device, or another source known in the art. Power pack 117 can produce one or both of a mechanical and electrical power output that is provided to front linkage 106 (e.g., actuators 128-134), propulsion unit 102L and propulsion unit 102R.

Excavator 100 can also comprise undercarriage coupler 136, which can be used to attach work tools or devices to excavator 100, such as at a front end in view of window 116, which can be positioned at the front of housing 104. In the illustrated example, undercarriage coupler 136 is connected to blade 138. However, other implements can be connected to undercarriage coupler 136, such as trenching tools and the like.

Excavator 100 can comprise a work machine configured to perform various operations associated with industries, such as mining, construction, farming, transportation, and others. Although the present disclosure is described with reference to a mobile excavating machine, the present disclosure can be applied to other types of fixed or mobile work machines, such as excavators, backhoes, track-type tractors, loaders, forest or logging machines, or any other earth moving machine or work machine, particularly those that include a front linkage or boom to which a work tool or implement can be connected. In the illustrated example, excavator 100 is shown with implement 124 comprising a shovel or bucket. However, implement 124 can comprise other tools, such as plows, augers, vibratory compactors, brush cutters, brooms, grapples, and the like.

In order to allow implement 124 to access various locations of a jobsite relative to platform 112, actuators 130-134 can allow for articulation of boom 120, stick 122 and implement 124 relative to each other. Furthermore, platform 112 can rotate relative to undercarriage assembly about vertical axis A1 and front linkage 106 can rotate relative to platform 112 about vertical axis A2. As such, the illustrated example of excavator 100 is equipped with house swing functionality and boom swing functionality. In other examples, excavator 100 can be configured to move implement 124 in various directions relative to axis A3 of stick 122. For example, many forest machines or logging machines can have implements that can be rotated about an axis aligned with vertical axis A3 (e.g., the axis of stick 122). In other examples, tiltrotors can be used to attach implements to stick 122, wherein the tiltrotor can radial movement of implement 124 relative to axis A3. Furthermore, some excavators can comprise compound booms wherein the relative position of proximal and distal ends of the boom can rotate relative to each other. Each of these points of articulation can increase the complexity of keeping track of the location of implement 124. Each of these points of articulation can be tracked by position sensors associated with excavator 100, thereby requiring additional computational power to determine the location of implement 124.

Typically, an operator of excavator 100 can be positioned within operator cab 114 to view front linkage 106 through window 116. Likewise, the fronts of propulsion unit 102L and propulsion unit 102R can be viewed through window 116 when housing 104 is aligned with propulsion units 102L and 102R. However, as the house swing angle and boom swing angle move housing 104 and front linkage away from centerline CL (FIG. 3) of undercarriage assembly 118, undercarriage assembly 118, housing 104 and front linkage 106 can become misaligned and it can be difficult for the operator of excavator 100 to maintain spatial orientation of the location of housing 104 relative to propulsion units 102L and 102R and of front linkage 106 relative to housing 104, particular in the case of, boom swing, offset booms and compound booms. With the present disclosure, housing 104 can include operator interface 360 (FIG. 4) to graphically illustrate, such as with position icons or indicators, the location of front linkage 106 and implement 124 relative to propulsion units 102L and 102R and designated avoidance zones (e.g., avoidance zone 162), as discussed with reference to FIG. 3.

Figure 3:
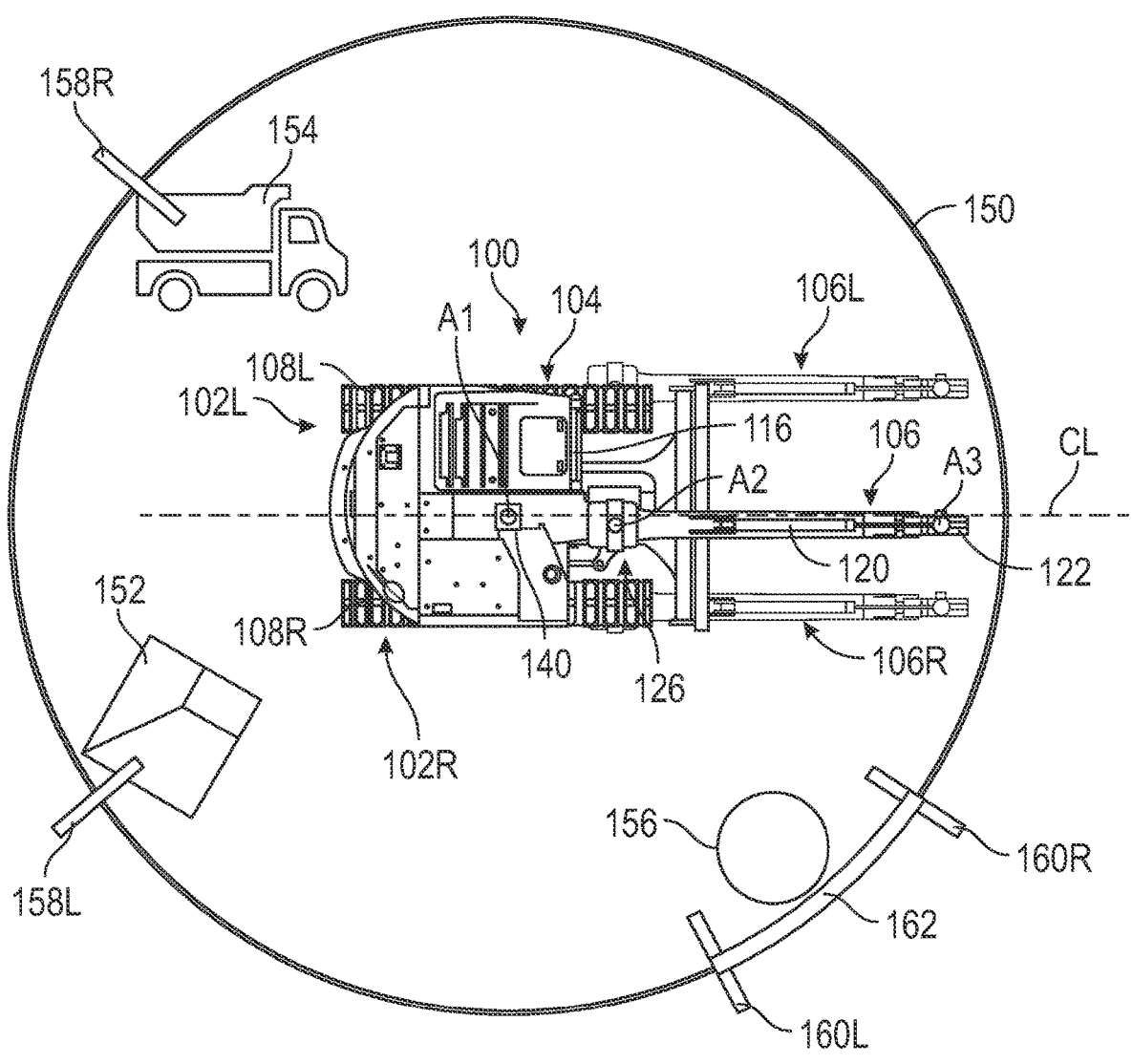
FIG. 3 is a top view of the excavator of FIG. 1 showing the location of the front linkage relative to the housing and left and right positions for the front linkage when the housing and swing coupler are rotated in opposite directions.

FIG. 3 is a top view of excavator 100 of FIG. 1 showing the location of front linkage 106 relative to housing 104. FIG. 3 additionally shows in dashed lines front linkage 106 in left position 106L and right position 106R Left position 106L represents the location of front linkage 106 of excavator 100 when housing 104 is rotated counter-clockwise about vertical axis A1 and boom 120 is rotated clockwise about vertical axis A2 to position front linkage 106 generally aligned with the outside of left propulsion unit 102L. Similarly, right position 106R represents the location of front linkage 106 of excavator 100 when housing 104 is rotated clockwise about vertical axis A1 and boom 120 is rotated counter-clockwise about vertical axis A2 to position front linkage 106 generally aligned with the outside of right propulsion unit 102R Left position 106L and right position 106R are facilitated by the inclusion of swing coupler 126 and are not possible in excavators lacking boom swing capabilities. However, because left position 106L and right position 106R are uniquely positioned relative to housing 104, such capabilities can increase the complexity of monitoring the location of front linkage 106.

Excavator 100 is illustrated in FIG. 3 inside work zone ring 150. Work zone ring 150 can comprise a circular perimeter surrounding excavator 100 that represents the ability of housing 104 to rotate relative to propulsion units 102L and 102R about vertical axis A1 and thus by extension the ability of implement 124 to rotate about vertical axis A1. Excavator 100 can be driven to a jobsite where excavator 100 is to use implement 124 to perform various operations. For example, excavator 100 can be used to dig trench 152. Earth or material removed from trench 152 can be deposited in haul truck 154. The jobsite can also include various objects or obstacles that excavator 100 is to avoid while traversing ground using propulsion units 102L and 102R and that front linkage 106 and implement 124 are to avoid when being moved about by excavator 100. For example, the jobsite can include object 156, which can comprise a house, a tree, a car, a light pole and the like. Note, that the relative sizes of trench 152, haul truck 154 and object 156 are not necessarily drawn to scale in FIG. 3. Furthermore, the radius of work zone ring 150 in FIG. 3 is not drawn to scale. For example, the radius of work zone ring 150 can extend to the furthest reach of implement 124 when boom 120 and stick 122 are fully extended away from vertical axis A2. However, work zone ring 150 is shown closer to excavator 100 in FIG. 3 for simplicity.

Work zone ring 150 can be used to define various fencing or "virtual wall" parameters for excavator 100, such as radial swing assist functions and radial swing stop functions, as described in greater detail below. Excavator 100 can include control 340 (FIG. 8) that coordinates operation of power pack 117, propulsion units 102L and 102R, and actuators 128-134. Control 340 can be programmed by an operator to guide and limit movements of excavator 100 to facilitate the performance of tasks and to avoid contact with objects. Excavator 100 can be employed by an operator to perform operations having repetitive tasks. For example, digging of trench 152 can involve repeated digging operations at trench 152 and repeated unloading operations at haul truck 154. Thus, front linkage 106 can be moved back and forth along the circumference of work zone ring 150 between trench 152 and haul truck 154. Control 340 can be configured to stop rotation of one or both of housing 104 relative to propulsion units 102L and 102R and front linkage 106 relative to housing 104 at the location of trench 152 and haul truck 154. As such, an operator of excavator 100 can program control 340 to include swing assist locations 158L and 158R. Thus, as the operator manipulates control levers 358 (FIG. 8) for excavator 100 to rotate housing 104 and rotate front linkage 106 to move implement 124 toward one of swing assist locations 158L and 158R when performing one of the load and dump operations, control 340 can stop movement of housing 104 at swing assist locations 158L and 158R

Thereafter, the operator can continue to use control levers 358 (FIG. 8) to perform excavator functions and move away from swing assist locations 158L and 158R such as to perform the other of the load and dump operations.

Furthermore, an operator of excavator 100 can program control 340 (FIG. 8) to include swing limits 160L and 160R that define avoidance zone 162. Avoidance zone 162 can comprise an arc segment and can be positioned along an arc length of work zone ring 150 at the location of object 156. Control 340 can be programmed by an operator to include left swing limit 160L and right swing limit 160R on opposite sides of object 156 to define avoidance zone 162. In examples, multiple avoidance zones can be positioned along work zone ring 150 at different locations. Thus, as the operator manipulates control levers 358 (FIG. 8) for excavator 100 to rotate housing 104 and front linkage 106 to move implement toward one of swing limits 160L and 160R, control 340 can stop movement of one or both of housing 104 and front linkage 106 at swing limits 160L and 160R, thereby preventing entry of implement 124 into avoidance zone 162. Thereafter, the operator cannot continue to use control levers 358 (FIG. 8) to move implement 124 into avoidance zone 162 unless control 340 is reprogramed to move or delete swing limits 160L and 160R.

In a default configuration, undercarriage assembly 118, housing 104, and front linkage 106 can be positioned to be aligned or parallel with centerline CL, which can extend through vertical axis A1 at the center of platform 112. However, as excavator 100 is operated the axes of housing 104 and front linkage 106 can become offset from centerline CL, as discussed with reference to FIGS. 5A-7B. Because it can be difficult for the operator to keep track of swing assists 158R and 158L and swing limits 160L and 160R, particularly as housing 104 is rotated so that window 116 does not face avoidance zone 162 and the boom swing of front linkage 106 is adjusted to one of positions 106L and 106R, operator interface 360 (FIG. 4) can be included in operator cab 114 to provide the operator with a visual indication of the proximity of front linkage 106 and implement 124 relative to propulsion units 102L and 102R, swing assists 158R and 158L, and avoidance zone 162.

Figure 4:
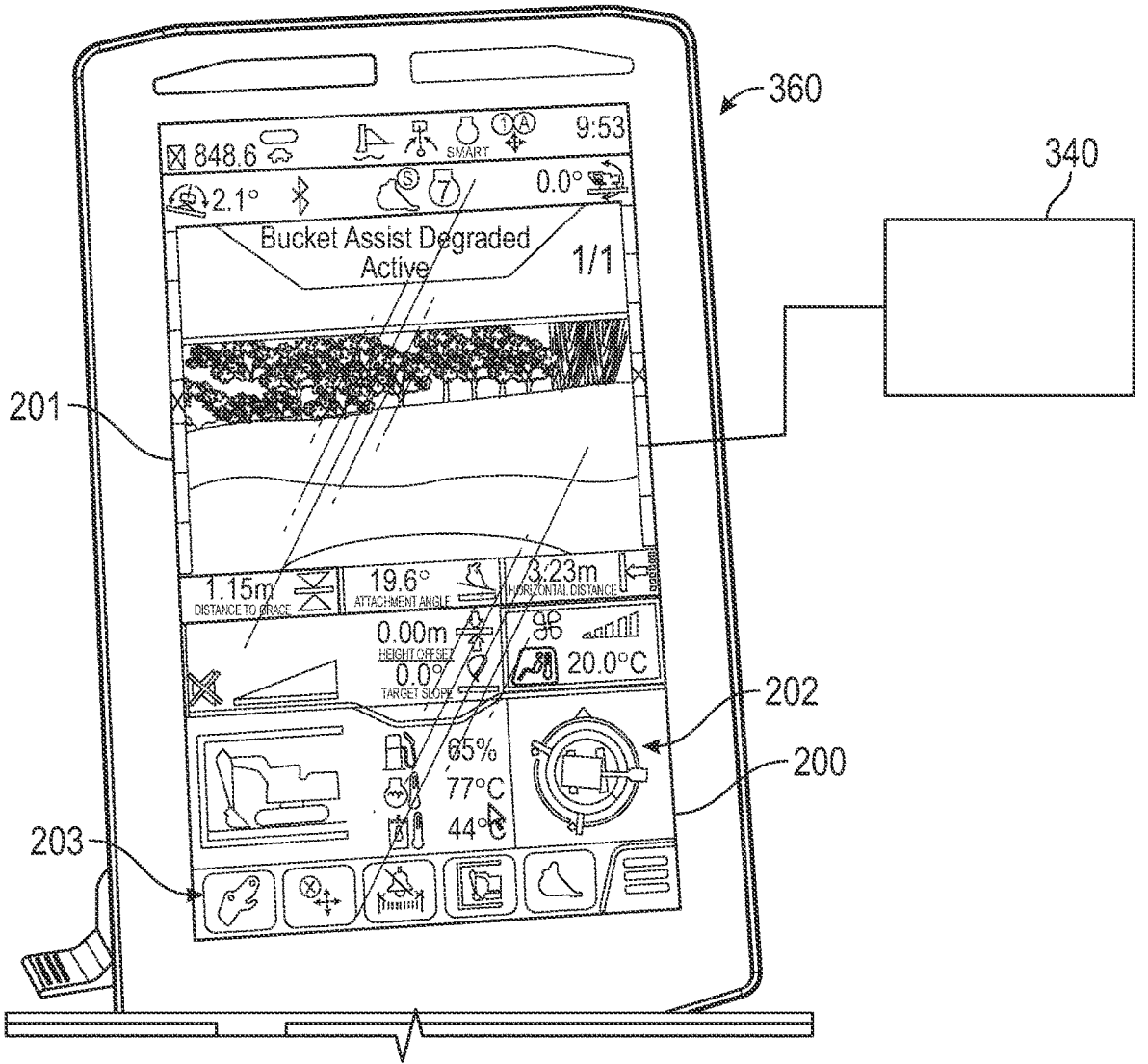
FIG. 4 is a schematic illustration of an operator interface showing output of a camera mounted to the housing and a position indicator for the front linkage relative to the propulsion units.

FIG. 4 is a schematic illustration of operator interface 360 showing camera view 201 and front linkage position indicator 202. Operator interface 360 can comprise various user-inputs 203, such as buttons, to enter information into operator interface 360 and to switch between camera views and other informational displays. Camera view 201 can provide a video representation of a view of an operator through window 116 (FIG. 1) of housing 104. As such, camera view 201 can provide an image of the jobsite in front of housing 104. However, camera view 201 can receive inputs from multiple cameras positioned on different sides of operator cab 114, whether inside operator cab 114 or outside of operator cab 114, to, for example, display a video representation of the sides and rear of excavator 100. An operator can select from different camera views using a button on operator interface 360.

Front linkage position indicator 202 can represent in graphical form the position of front linkage 106 relative to propulsion units 102L and 102R, swing assists 158R and 158L, and avoidance zone 162. For example, front linkage position indicator 202 can comprise electronic indicia comprising indicators, icons or other representations of excavator 100 and portions thereof relative to the surrounding environment as represented by user-defined points, such as swing assist points and swing limit points that can be correlated to the position of real-world objects in the jobsite.

Front linkage position indicator 202 can be updated in real-time by control 340 (FIG. 8) as a house swing operation is executed to rotate housing 104 relative to propulsion units 102L and 102R and as a boom swing operation is executed to rotate front linkage 106 relative to housing 104. As discussed with reference to FIGS. 5B, 6B and 7B, front linkage position indicator 202 can include moveable indicators or icons to show an operator of excavator 100 at a glance the orientation of housing 104 relative to propulsion units 102L and 102R and the proximity of front linkage 106 to avoidance zone 162 or swing assists 158R and 158L.

Figure 5B:
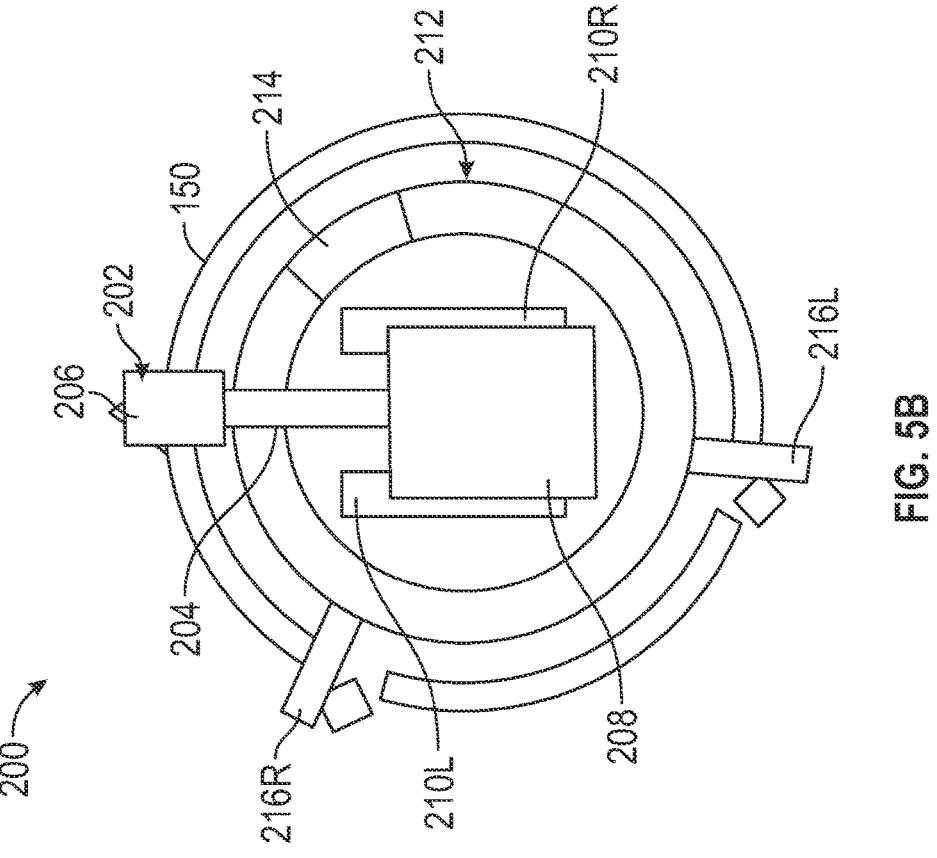
FIG. 5B is a schematic illustration of a front linkage position indicator for the first configuration of FIG. 5A.
Figure 5A:
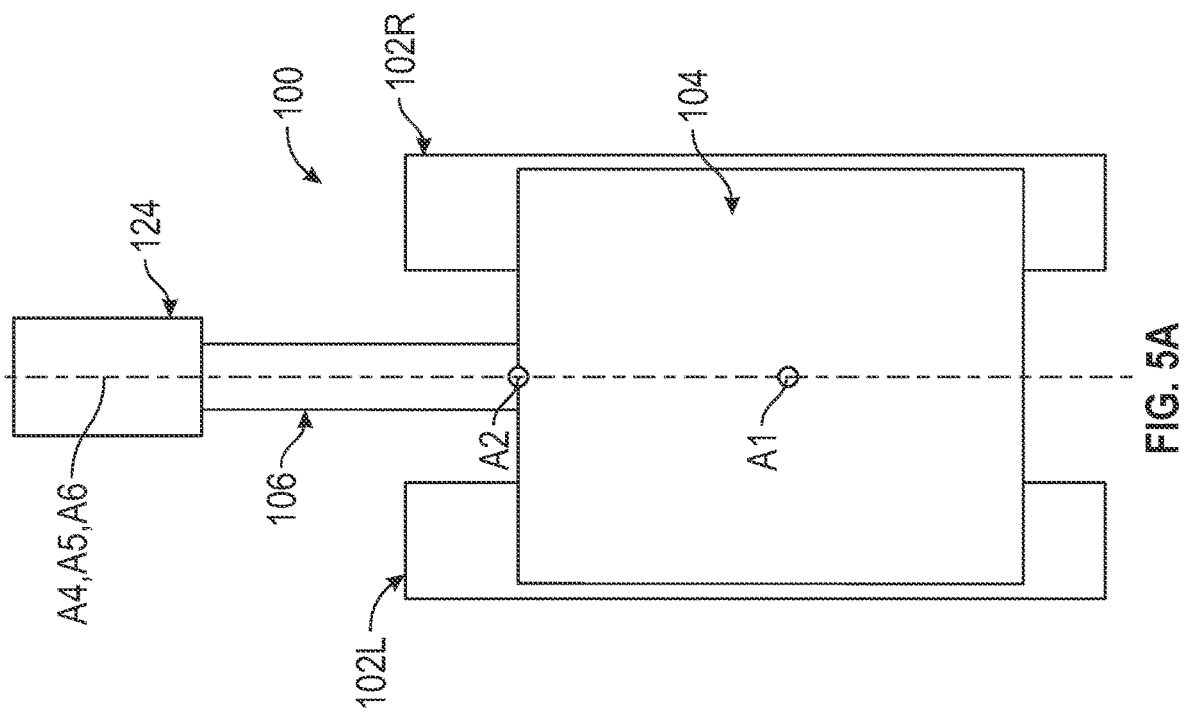
FIG. 5A is a schematic illustration of a real-world position of a housing of an excavator relative to propulsion units and a front linkage relative to the housing in a first configuration.

FIG. 5A is a schematic illustration of a real-world position of housing 104 of excavator 100 relative to propulsion units 102L and 102R and front linkage 106 relative to housing 104 in a first configuration. FIG. 5B is a schematic illustration of indicator panel 200 showing front linkage position indicator 202 for the first configuration of FIG. 5A. Front linkage position indicator 202 can comprise boom indicator 204 and implement indicator 206. Indicator panel 200 can further comprising housing indicator 208 and propulsor indicators 210L and 210R Indicators representative of excavator 100 can be shown relative to work zone ring 150 and swing ring indicator 212, which can include avoidance zone indicator 214 and swing limit indicators 216L and 216R.

Boom indicator 204 can comprise indicia or an icon representing boom 120 and stick 122. Implement indicator 206 can comprise indicia or an icon representing implement 124. Housing indicator 208 can comprise indicia or an icon representing housing 104. Propulsor indicators 210L and 210R can comprise indicia or icons representing propulsion units 102L and 102R.

Propulsor indicators 210L and 210R can approximate the shape of propulsion units 102L and 102R. Propulsor indicators 210L and 210R can comprise a pair of equally sized, spaced apart rectangles. These rectangles can have a fixed orientation with their major axes extending in a front-to-back orientation parallel with horizontal axis A4. Housing indicator 208 can approximate the shape of housing 104 and more particularly the perimeter of platform 112. Housing indicator 208 can comprise a rectangle superimposed on top of propulsor indicators 210L and 210R. The orientation of housing indicator can rotate about vertical axis A1. Boom indicator 204 can approximate a top-down view of boom 120 and stick 122 in their fully extended position. Boom indicator 204 can comprise a rectangle extending from housing indicator 208. Implement indicator 206 can comprise a rectangle approximately in the shape of implement 124 and can be positioned distal of boom indicator 204 in a fixed position.

The orientation of excavator 100 as positioned within a jobsite can be referenced relative to undercarriage assembly 118 (FIG. 1), which can extend along a center axis represented by horizontal axis A4. The orientation of housing 104, which can extend along a center axis represented by horizontal axis A5, can be referenced relative to undercarriage assembly 118. The orientation of front linkage 106, which can extend along a center axis represented by horizontal axis A6, can be referenced relative to housing 104.

In the first configuration, the front of housing 104 can be aligned with the front of undercarriage assembly 118 about vertical axis A1 such that horizontal axis A5 of housing 104 aligns with horizontal axis A4 of undercarriage assembly 118. Additionally, horizontal axis A6 of boom 120 can be aligned with horizontal axis A5 of housing 104 about vertical axis A2.

The position of propulsor indicators 210L and 210R can be fixed within indicator panel 200 and can align with the real-world orientation of propulsion units 102L and 102R. That is the oblong or elongate orientation of propulsion units 102L and 102R can extend parallel to horizontal axis A4. Based on the first configuration, front linkage position indicator 202 can be configured such that boom indicator 204 is aligned with housing indicator 208, e.g., extending straight out therefrom, and housing indicator 208 can be aligned with propulsor indicators 210L and 210R, e.g., squared with the outer perimeter formed by propulsor indicators 210L and 210R. Implement indicator 206 can be fixed relative to boom indicator 204 at the distal end thereof. Avoidance zone indicator 214 can be positioned about a portion of swing ring indicator 212 based on operator inputs, as discussed herein.

FIGS. 5A and 5B can, therefore, illustrate the orientation of excavator 100 when, for example, first arriving at a jobsite. Such an orientation can correspond to the orientation of FIGS. 1-3. Once at the jobsite, the operator can utilize operator interface 360 (FIG. 4) to generate avoidance zone indicator 214. For example, avoidance zone indicator 214 can comprise a building or structure to be avoided.

Figures 6A, 6B:
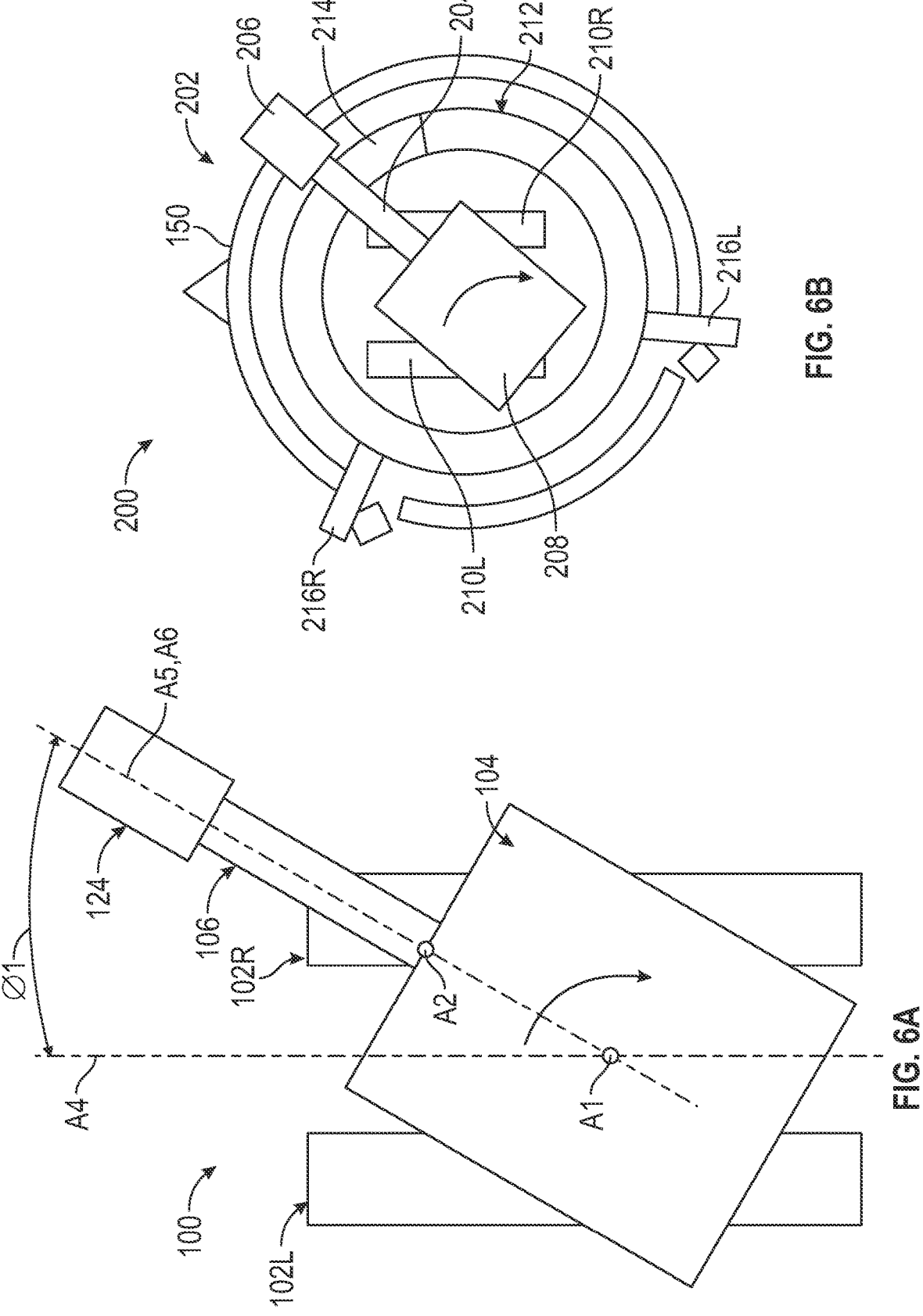
FIG. 6A is a schematic illustration of a real-world position of a housing of an excavator relative to propulsion units and a front linkage relative to the housing in a second configuration.
FIG. 6B is a schematic illustration of a front linkage position indicator for the second configuration of FIG. 6A.

FIG. 6A is a schematic illustration of a real-world position of housing 104 of excavator 100 relative to propulsion units 102L and 102R and front linkage 106 relative to housing 104 in a second configuration. FIG. 6B is a schematic illustration of front linkage position indicator 202 for the second configuration of FIG. 6A. FIGS. 6A and 6B are discussed concurrently.

In the second configuration, the front of housing 104 can be rotated relative to the front of undercarriage assembly 118 about vertical axis A1 such that axis A5 of housing 104 is offset from axis A4 of undercarriage assembly 118 by angle Ø1. Additionally, horizontal axis A6 of boom 120 can be aligned with horizontal axis A5 of housing 104 about vertical axis A2. Thus, FIGS. 6A and 6B illustrate a house swing operation without a boom swing operation.

The position of propulsor indicators 210L and 210R can be fixed within indicator panel 200 and can align with the real-world orientation of propulsion units 102L and 102R. Thus, the positions of propulsor indicators 210L and 210R can remain the same from the first configuration to the second configuration. Based on the second configuration, front linkage position indicator 202 can be configured such that boom indicator 204 is aligned with housing indicator 208 and housing indicator 208 is rotated relative to propulsor indicators 210L and 210R. Thus, as housing 104 rotates clockwise in FIG. 6A, housing indicator 208 is rotated clock-wise a corresponding amount in FIG. 6B. The implement indicator 206 can be fixed relative to boom indicator 204 so that implement indicator 206 rotates clock-wise with housing indicator 208. Avoidance zone indicator 214 can be positioned about a portion of swing ring indicator 212 in the same position as in the first configuration.

FIGS. 6A and 6B can, therefore, illustrate the orientation of excavator 100 when, for example, attempting to move implement 124 close to avoidance zone 162 at a jobsite, as indicated by avoidance zone indicator 214 by moving house 104 and not front linkage 106. Avoidance zone indicator 214 can thus be used to avoid colliding with the structure or objects within avoidance zone 162.

Figure 7B:
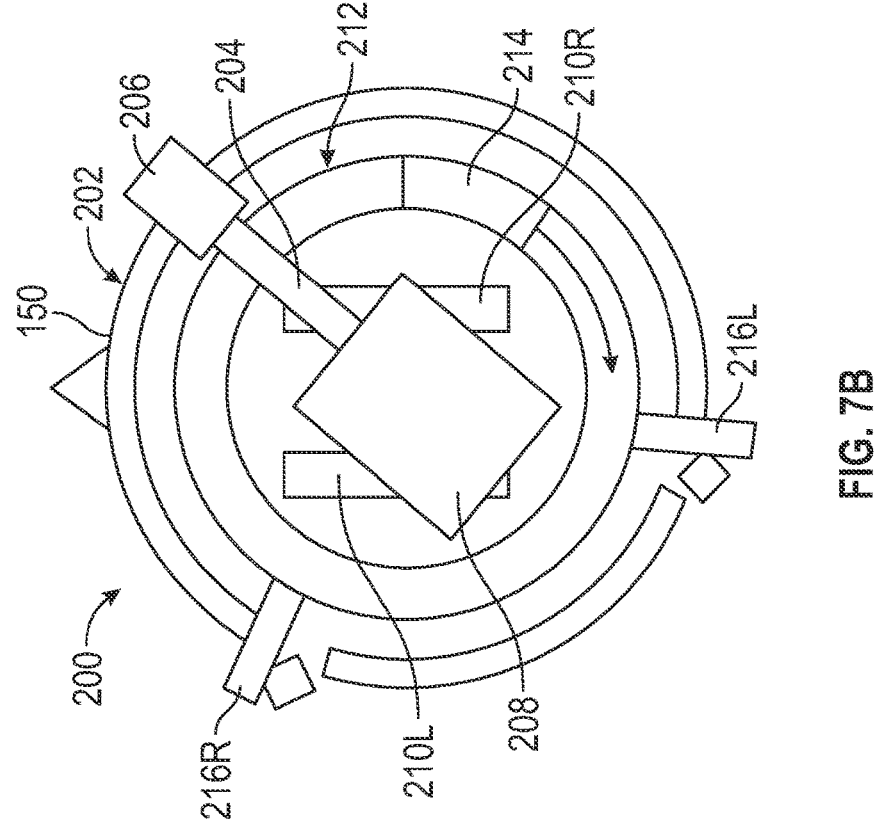
FIG. 7B is a schematic illustration of a front linkage position indicator for the third configuration of FIG. 7A.
Figure 7A:
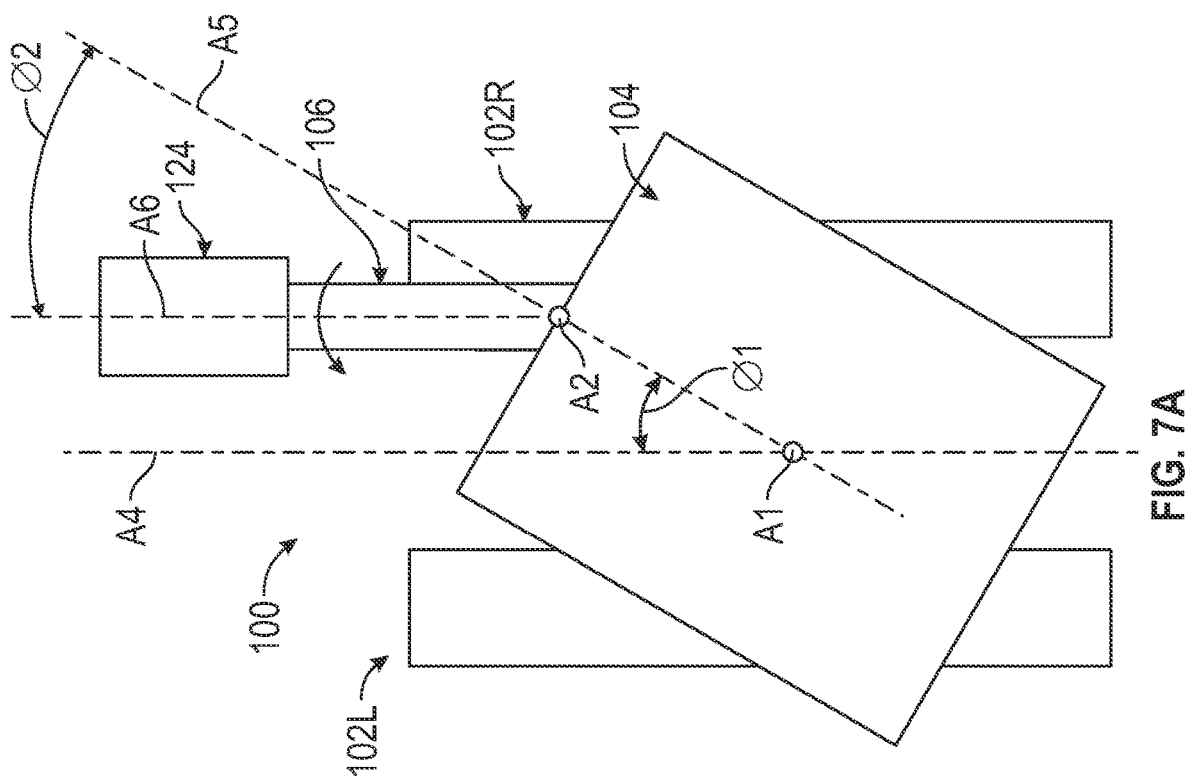
FIG. 7A is a schematic illustration of a real-world position of a housing of an excavator relative to propulsion units and a front linkage relative to the housing in a third configuration.

FIG. 7A is a schematic illustration of a real-world position of housing 104 of excavator 100 relative to propulsion units 102L and 102R and front linkage 106 relative to housing 104 in a third configuration. FIG. 7B is a schematic illustration of front linkage position indicator 202 for the third configuration of FIG. 7A. FIGS. 7A and 7B are discussed concurrently. FIGS. 7A and 7B illustrate a boom swing operation without a house swing operation.

In the third configuration, the position of propulsor indicators 210L and 210R can be fixed within indicator panel 200 and can align with the real-world orientation of propulsion units 102L and 102R. Thus, the positions of propulsor indicators 210L and 210R can remain the same from the second configuration to the third configuration.

Additionally, the front of housing 104 can be rotated relative to the front of undercarriage assembly 118 about vertical axis A1 such that axis A5 of housing 104 is offset from axis A4 of undercarriage assembly 118 by angle Ø1. Thus, angle Ø1 can remain the same from the second configuration to the third configuration. Further, based on the third configuration, front linkage position indicator 202 can be configured such that boom indicator 204 remains the same relative to housing indicator 208. The implement indicator 206 can be fixed relative to boom indicator 204 so that implement indicator 206 remains aligned with housing indicator 208.

In the third configuration, horizontal axis A6 of boom 120 can be rotated relative to axis A5 of housing 104 about vertical axis A2 such that axis A6 of boom 120 is offset from axis A5 of housing 104 by angle Ø2. However, as front linkage 106 rotates counter-clockwise in FIG. 7A, avoidance zone indicator 214 rotates clockwise a corresponding amount in FIG. 7B. As such, rather than the position of boom indicator 204 being rotated relative to housing indicator 208 to correspond to the real-world position of boom 120 due to the boom swing operation, the position of avoidance zone indicator 214 can be rotated, thereby simplifying the display of front linkage position indicator 202 while still providing a clear representation of the distance between front linkage indicator 202 and avoidance zone indicator 214. For example, boom indicator can remain straight rather than being angled relative to housing indicator 208, thereby avoiding the generation of a complex indicator that might require interpretation of scrutiny by the operator. Front linkage indicator 202 can convey the desired information to the operator without complexity.

Additionally, the representation and display of front linkage indicator 202 as described herein can accommodate other movements of implement 124, such as movements about vertical axis A3 (FIG. 1) due to articulated implements or component movements of boom 120 without overly complicating information being conveyed to the operator. For example, a shortening or lengthening of boom 120 due to a compound boom may slightly change the position of implement 124 relative to avoidance zone 162, for example. But, changing the shape of front linkage indicator 220 due to a change in shape of boom 120 does not provide the operator with useful information that can be clearly conveyed by simply indicating the distance between implement indicator 206 and avoidance zone indicator 214.

Furthermore, control 340 need not have to process additional data from sensors 344-356 and communication bandwidth of control 340 need not be consumed. Thus, control 340 can have processing power available to other operations that are potentially more relevant or needed by the operator, or control 340 can be produced with less cost.

Although, swing assist indicators 216L and 216R are not illustrated as moving in FIG. 7B, the rotational position of swing assist indicators 216L and 216R can move about work zone ring 150 in a similar fashion as avoidance zone indicator 214 based on a boom swing operation. That is, the relative position between swing assist indicators 216L and 216R and front linkage position indicator 202 can be reflected in a rotational movement of swing assist indicators 216L and 216R in the opposite direction of a rotational movement of front linkage 106. In other examples, swing assist indicators 216L and 216R can move about work zone ring 150 without movement of avoidance zone indicator 214.

Figure 8:
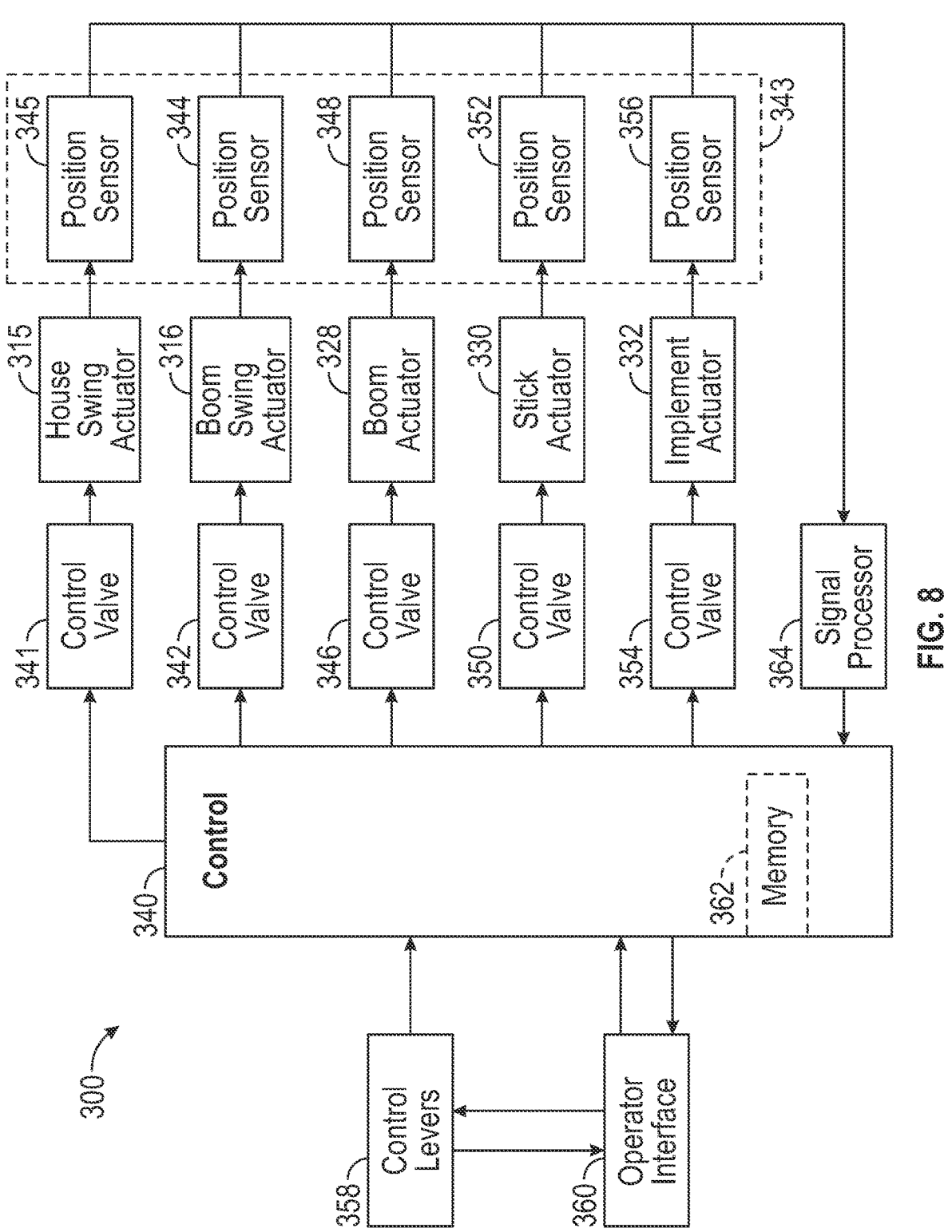
FIG. 8 is a schematic diagram illustrating a control system for the excavator of FIGS. 1-7B.

FIG. 8 is a schematic diagram illustrating control system 300 for excavator 100 of FIGS. 1-7B.

Excavator 100 can include control 340. Control 340 can include a computer, which has all the components required to run an application, such as, for example, memory 362, a secondary storage device, a processor, such as a central processing unit, and an input device. One skilled in the art will appreciate that this computer can contain additional or different components. Furthermore, although aspects of the present invention are described as being stored in memory, one skilled in the art will appreciate that these aspects can also be stored on or read from other types of computer program products or non-transitory computer-readable media, such as computer chips and secondary storage devices, including hard disks, floppy disks, CD-ROM, or other forms of RAM or ROM.

Control 340 can be operatively connected to a series of control valves 341, 342, 346, 350, and 354. Control valve 341 can be disposed in a fluid line leading to an actuator, e.g., actuator 140 (FIG. 3) for housing 104. Control valve 342 can be disposed in a fluid line leading to actuator 128. Control valve 346 can be disposed in a fluid line leading to boom actuator 130. Control valve 350 can be disposed in a fluid line leading to stick actuator 132. Control valve 354 can be disposed in a fluid line leading to implement actuator 134.

Each control valve 341, 342, 346, 350, and 354 can be configured to control the rate and direction of fluid flow to the chambers of their respective hydraulic actuator. Each control valve 341, 342, 346, 350, and 354 can be, for example, a directional control valve such as a set of five independent metering valves. Alternatively, each control valve 341, 342, 346, 350 and 354 can be a spool valve, a split-spool valve, or any other mechanism configured to control the rate and direction of a fluid flow into and out of a hydraulic actuator.

Control 340 can be configured to control the positions of control valves 341, 342, 346, 350, and 354 to thereby control the rate and direction of fluid flow to the respective hydraulic actuators. By controlling the rate and direction of fluid flow through control valves 341, 342, 346, 350, and 354, control 340 can control the rate and direction of movement of housing 104, front linkage 106, boom 120, stick 122, and implement 124. In this manner, control 340 can control the overall rate and direction of movement of front linkage 106.

Excavator 100 can also include position sensing system 343 that can provide information on the position of front linkage 106 and implement 124. Position sensing system 343 can include a series of sensors 345, 344, 348, 352, and 356 that are adapted to sense the position of housing 104, front linkage 106 and implement 124. The series of sensors can be any type of sensor commonly used to determine the relative positions of the elements of a mechanical linkage.

In examples, position sensors 345, 344, 348, 352, and 356 can be configured to determine the relative positions of housing 104 and each element in front linkage 106 supporting implement 124 and implement 124. Position sensor 345 can be configured to measure the angle of rotation of housing 104 relative to undercarriage assembly 118, which can be referred to as house swing. Position sensor 344 can be configured to measure the angle of rotation of swing coupler 126 relative to housing 104, which can be referred to as boom swing. Position sensor 348 can be configured to measure the angle of rotation of boom 120 relative to housing 104. Position sensor 352 can be configured to measure the angle of rotation between boom 120 and stick 22. Position sensor 356 can be configured to measure the angle of rotation between stick 122 and implement 124. From this information, control 340 can determine the location of implement 124 relative to housing 104. In additional examples, position sensors 345, 344, 352, and 356 can be configured to output linkage angles relative to gravity, such as inertial measurement units (IMUs), that can additionally be used to calculate the positions of boom 120, stick 122 and implement 124. Thus, position sensors 345, 344, 352, and 356 can be configured to output additional data or information other than position data, such as acceleration, orientation, angles, and the like.

Alternatively, position sensors 345, 344, 348, 352, and 356 can be configured to determine the relative displacement of the respective actuator, i.e. to determine the distance that the actuator is extended. Position sensor 345 can be configured to measure the extension of a hydraulic cylinder used to rotate housing 104 relative to undercarriage assembly 118 (FIG. 1). Position sensor 344 can be configured to measure the extension of actuator 128 associated with swing coupler 126. Position sensor 348 can be configured to measure the extension of actuator 128 for boom 120. Position sensor 352 can be configured to measure the extension of actuator 130 for stick 122. Position sensor 356 can be configured to measure the extension of actuator 132 for tool or implement 124. From this information, control 340 can also determine the location of implement 124 relative to housing 104.

As will be apparent to one skilled in the art, by knowing the displacement of the actuators, the positions of boom 120, stick 122, and implement 124 relative to housing 104 can be determined through straightforward trigonometric calculations. Position sensing system 343 can transmit this positional information to control 340. Signal processor 364 can be included to condition the position signals. Thus, position sensing system 343 can provide the information required for control 340 to calculate the current position of implement 124. Control 340 can use the positional information to determine the velocity, direction, and acceleration rate of implement 124.

Control 340 can receive movement instructions from one or both of an operator and an automated control program. For example, an operator can manipulate an input device consisting of a set of control levers 358 to provide the movement instructions. The set of control levers 358 can include, for example, one lever to control the motion of each of house swing actuator 315 (e.g., actuator 140) and the position of housing 104, boom swing actuator 316 (e.g., actuator 128) and the position of swing coupler 126, boom actuator 328 (e.g., actuator 130) and the position of boom 120, stick actuator 330 (e.g., actuator 132) and the position of stick 122, and tool actuator 332 (e.g., actuator 134) and the position of implement 124. By selectively moving the set of control levers 358, an operator can individually and selectively control the rate and direction of movement of each of housing 104, swing coupler 126, boom 120, stick 122, and implement 124. Thus, by coordinating movement of control levers 358, the operator can control motion of front linkage 106. In addition, control 340 can include an automated program that provides movement instructions for front linkage 106 and implement 124 to guide implement 124 throughout an entire work cycle.

Excavator 100 can also include operator interface 360. Operator interface 360 can provide an interface between an operator and control 340. Operator interface 360 can allow the operator to input information to control 340 and can display information from control 340 to the operator. Operator interface 360 can include an input device, such as, for example, a touch screen, a keyboard, a mouse, or a joystick. An operator can input information through the input device related to a particular job. This information can include, for example, the location of obstacles, such as object 156, the location of trench 152 and haul truck 154 (FIG. 3).

Operator interface 360 can also allow the operator to set locations for swing assist locations 158L and 158R, swing limits 160L and 160R, and avoidance zone 162 relative to propulsion units 102L and 102R Swing assist locations 158L and 158R and avoidance zone 162 relative to propulsion units 102L and 102R can be set by housing 104 and front linkage 106 to move implement 124 into a certain spatial relationship with respect to the location of undercarriage assembly 118.

For example, operator interface 360 can provide a representation of excavator 100, such as by showing propulsor indicators 210L and 210R, housing indicator 208, and front linkage position indicator 202, as shown in FIG. 5A. Operator interface 360 can display swing ring indicator 212 surrounding propulsor indicators 210L and 210R and housing indicator 208. The operator can touch operator interface 360, such as with user-inputs 203, or otherwise engage features of operator interface 360, to input swing assist locations 158L and 158R and swing limits 160L and 160R. Control 340 can store in memory 362 the settings for swing assist locations 158L and 158R and swing limits 160L and 160R and display corresponding graphics for indicators avoidance zone indicator 214 and swing limit indicators 216R and 216L. As such, control 340 can determine when output from position sensors 345-356 can be used to stop movement of any portion of excavator 100 to comply with the used determined swing assist and swing stop settings, such as be preventing operation of actuators 315-332.

INDUSTRIAL APPLICABILITY

An operator can position excavator 100 at a particular geographic location at which excavation is desired, such as at a jobsite. The operator can select inputs for swing assist locations 158L and 158R and swing limits 160L and 160R based upon the desired operation to be performed and the surrounding environment. Swing assist locations 158L and 158R and swing limits 160L and 160R can be positioned relative to trench 152, haul truck 154 and object 156. The operator can set swing assist locations 158L and 158R and swing limits 160L and 160R by rotating one or both of housing 104 and front linkage 106 to place implement 124 in a certain spatial relationship to the desired features of the jobsite.

When implement 124 is properly positioned, the operator can indicate to control 340, such as by depressing a button, that the swing assist locations 158L and 158R and swing limits 160L and 160R should be set. Upon receipt of the indication, control 340 can determine the current rotational angles of housing 104 and front linkage 106 and stores the current rotational angles in memory 362. Once swing assist locations 158L and 158R and swing limits 160L and 160R are established, the operator can start removing material from the geographic location.

Operator interface 360 can thereafter generate graphics for indicators avoidance zone indicator 214 and swing limit indicators 216R and 216L on a display screen additionally showing front linkage position indicator 202 and propulsor indicators 210L and 210R The display screen can be monitored by an operator to monitor the operation of excavator 100.

As the operator moves housing 104 and front linkage 106, control 340 can monitor the position of implement 124 relative to excavator 100, e.g., undercarriage assembly 118 using, for example, position sensors 345-356 of position sensing system 343. In particular, the position of implement 124 can be sensed by position sensors 345, 348, 352, and 356. In addition, the position of front linkage 106 and implement 124 relative to swing assist locations 158L and 158R and swing limits 160L and 160R can be determined by position sensors 345-356.

Figure 9:
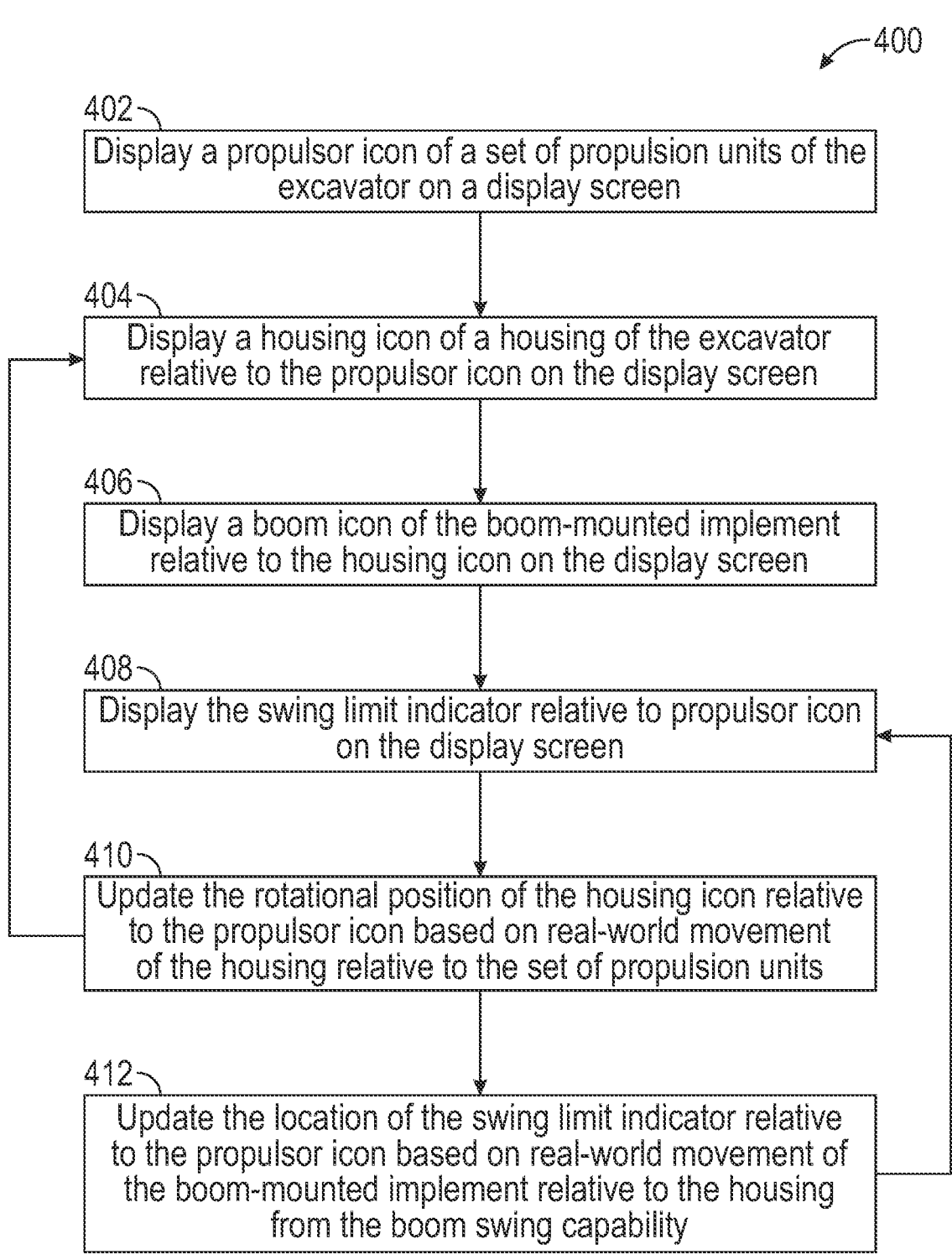
FIG. 9 is a line diagram showing various operations for methods of indicating a position of an excavator front linkage and implement relative to propulsor units and swing limits.

Once the position of implement 124 relative to swing assist locations 158L and 158R and swing limits 160L and 160R has been determined, control 340 can provide a display screen illustrating the current position of front linkage 106 and implement 124 relative to operator interface 360. The display of operator interface 360 can, for example, provide a top view that illustrates the position of excavator 100, front linkage 106 and implement 124 relative to a jobsite. Control 340 can update the display of operator interface 360 as the operator moves housing 104, front linkage 106 and implement 124 to excavate material. Control 340 can also provide an indication to the operator, such as a warning beep, when implement 124 moves close to or is at swing assist locations 158L and 158R and swing limits 160L and 160R, which can be confirmed by referencing avoidance zone indicator 214 and swing limit indicators 216R and 216L on the display screen additionally showing front linkage position indicator 202 and propulsor indicators 210L and 210R FIG. 9 is a line diagram showing various operations for method 400 of indicating a position of implement 124 relative to propulsion units 102L and 102R and swing limits 160L and 160R.

At operation 402, control 340 can display a propulsor indicators 210L and 210R for propulsion units 102L and 102R of excavator 100 on a display screen of operator interface 360.

At operation 404, control 340 can display housing indicator 208 of housing 104 relative to propulsor indicators 210L and 210R on the display screen of operator interface 360.

At operation 406, control 340 can display boom indicator 204 of front linkage 106 relative to housing indicator 208 on the display screen of operator interface 360.

At operation 408, control 340 can display avoidance zone indicator 214 relative to propulsor indicators 210L and 210R on the display screen of operator interface 360.

At operation 410, control 340 can update the rotational position of housing indicator 208 relative to propulsor indicators 210L and 210R based on real-world movement of housing 104 relative to propulsion units 102L and 102R.

At operation 412, control 340 can update the location of avoidance zone indicator 214 relative to propulsor indicators 210L and 210R based on real-world movement of implement 124 relative to housing 104 from boom swing capabilities.

In this manner, the work machine monitoring system and methods described herein can be used to provide positional information to the operator of an excavating work machine related to the relative position of propulsion units, a housing, a front linkage and an implement relative to positional fencing or "virtual walls" for movement of the excavating work machine. The described systems and methods allow the operator to view relevant positional information quickly and easily in a simplified format without having to interpret undesirable information. As such the work machine monitoring system can collect detailed information regarding the operation and position of various moving components of an excavating work machine, but can distill a large volume of that data into a simple, yet informative, display icon or indicator for the operator, thereby also saving computational power of a control system for the excavating work machine.

What is claimed is:

1. A method for displaying a rotational position of a boom-mounted implement relative to a swing indicator for an excavator having a boom swing capability, the method comprising:

displaying a propulsor icon of a set of propulsion units of the excavator on a display screen, the set of propulsion units defining a plane within the display screen;

displaying a housing icon of a housing of an operator cab of the excavator relative to the propulsor icon on the display screen, the housing configured to rotate about a rotation axis perpendicular to the plane;

displaying a boom icon of the boom-mounted implement in a fixed position in the plane relative to the housing icon on the display screen, wherein the boom-mounted implement is configured to move relative to the housing using a boom that is configured to pivot relative to the housing about a swing axis perpendicular to the plane;

displaying the swing indicator relative to the propulsor icon on the display screen;

updating a rotational position of the housing icon along the rotation axis relative to the propulsor icon based on real-world movement of the housing relative to the set of propulsion units; and updating a rotational location of the swing indicator about the rotation axis relative to the propulsor icon based on real-world movement of the boom-mounted implement relative to the housing from movement of the boom on the swing axis;

wherein the swing indicator comprises an avoidance zone that is user-selectable to define limits where the boom-mounted implement is prevented from entering;

wherein the swing indicator moves relative to the propulsor icon to maintain real-world spacing between the boom icon and the avoidance zone when the boom pivots relative to the housing while the boom icon remains in a fixed position relative to the housing icon.

2. The method of claim 1, further comprising:

maintaining a position of the propulsor icon fixed; and maintaining a position of the boom icon relative to the housing icon fixed.

3. The method of claim 1, wherein displaying the avoidance zone relative to the propulsor icon on the display screen comprises:

displaying an arc segment having a center-point located at the rotation axis of rotation of the housing icon relative to the propulsor icon.

4. The method of claim 3, wherein updating the location of the avoidance zone relative to the propulsor icon based on real-world movement of the boom-mounted implement relative to the housing from the boom swing capability comprises:

rotating the arc segment about a work zone ring surrounding the housing icon.

5. The method of claim 4, wherein the swing indicator further comprises swing assist indicator.

6. The method of claim 4, further comprising entering locations for the swing indicator into an operator interface for the excavator to correspond to real-world boundaries for movement of the boom-mounted implement.

7. The method of claim 1, wherein the boom-mounted implement is connected to the housing via a front linkage comprising:

the boom extending from the housing;

a stick extending from the boom; and a rotating coupler connecting the boom-mounted implement to the boom;

wherein the stick is coupled to the boom via a pivoting connection that allows the stick to rotate relative to the boom; and wherein the location of the boom icon of the boom-mounted implement relative to the housing icon on the display screen remains fixed relative to the housing icon.

8. The method of claim 7, wherein updating the location of the swing indicator relative to the propulsor icon based on real-world movement of the boom-mounted implement relative to the housing from the boom swing capability comprises:

updating the location of the swing indicator relative to the propulsor icon based on real-world movement of the stick relative to the boom from the pivoting connection.

9. The method of claim 1, further comprising:

transmitting position sensor data from the excavator to an operator interface for the excavator;

computing real-world locations for the housing and boom-mounted implement of the excavator from the position sensor data; and updating the rotational position of the housing icon and swing indicator based on computed real-world locations for the housing and boom-mounted implement.

10. The method of claim 1, wherein:

the propulsor icon comprises a pair of equally sized and spaced apart rectangles;

the housing icon comprises a rectangle superposed on the propulsor icon; and the boom icon comprises a rectangle extending from the rectangle of the housing icon.

11. A control system for an excavator, the control system comprising:

a control configured to receive a plurality of inputs from a plurality of position sensors associated with a housing and a front linkage of the excavator, wherein the plurality of inputs includes a boom swing sensor configured to sense an angular position of the front linkage relative to the housing in a plane parallel to a horizontal reference plane; and an operator interface comprising:

a display screen configured to output:

a propulsor icon representing a set of propulsion units of the excavator;

a housing icon representing the housing of the excavator;

a boom icon representing the front linkage of excavator; and a swing indicator positioned relative to the propulsor icon;

wherein the control is configured to:

update a rotational position of the housing icon relative to the propulsor icon based on real-world movement of the housing relative to the set of propulsion units; and update a location of the swing indicator relative to the propulsor icon based on real-world rotational movement of the front linkage relative to the housing in the horizontal reference plane as sensed by the boom swing sensor, wherein a position of the boom icon relative to the housing icon is maintained fixed such that the boom icon does not indicate a real-world position of the front linkage relative to the housing when the front linkage is rotated relative to the housing; and wherein the location of the swing indicator comprises a position of an indicator about a work zone ring circumscribing the propulsor icon.

12. The control system of claim 11, wherein operator interface comprises user inputs to allow a user to define the swing indicator.

13. The control system of claim 11, wherein the plurality of inputs from the plurality of position sensors associated with the housing and the front linkage of the excavator comprise:

a house swing sensor configured to sense a rotational position of the housing relative to the set of propulsion units along a first vertical axis.

14. The control system of claim 13, wherein;

boom swing sensor is configured to sense a position of an actuator disposed in the horizontal reference plane;

wherein the front linkage is configured to rotate along a second vertical axis that is offset from the first vertical axis.

15. The control system of claim 14, wherein the front linkage comprises:

a swing coupler connected to the housing;

a boom extending from the swing coupler; and a stick extending from the boom;

wherein:

the swing coupler permits the boom to rotate in the horizontal reference plane relative to the housing; and the stick is coupled to the boom so that the stick can rotate in a vertical plane relative to the boom.

16. The control system of claim 15, wherein the control is configured to update the location of the swing indicator relative to the propulsor icon based on real-world movement of the stick relative to the boom at a pivoting connection.

17. The control system of claim 11, wherein the control is configured to:

maintain a position of the propulsor icon fixed.

18. The control system of claim 11, wherein the control is configured to display on the operator interface the swing indicator as an arc segment having a center-point located at an axis of rotation of the housing icon relative to the propulsor icon, wherein the arc segment comprises the indicator that moves along the work zone ring.

19. The control system of claim 18, wherein the control is configured to rotate the arc segment about the housing icon as the housing rotates relative to the set of propulsion units.

20. The control system of claim 11, wherein:

the propulsor icon comprises a pair of equally sized and spaced apart rectangles;

the housing icon comprises a rectangle superposed on the propulsor icon; and the boom icon comprises a rectangle extending from the rectangle of the housing icon.

* * * * *